US006086761A

United States Patent [19]

Green

[11] Patent Number: 6,086,761

[45] Date of Patent: Jul. 11, 2000

[54] MAGNETIC SEPARATOR APPARATUS

[75] Inventor: Frederick H. Green, Spring Hill, Kans.

[73] Assignee: American Phoenix, Inc., Houston, Tex.

[21] Appl. No.: 09/028,651

[22] Filed: Feb. 24, 1998

Related U.S. Application Data

[60] Provisional application No. 60/038,966, Feb. 24, 1997.

[51] Int. Cl.[7] .......... B01D 35/06

[52] U.S. Cl. .......... 210/222; 210/396; 210/400; 209/218; 209/226; 198/690.1

[58] Field of Search .......... 210/222, 223, 210/396, 400; 209/218, 226; 198/690.1

[56] References Cited

U.S. PATENT DOCUMENTS

| | | | |
|---|---|---|---|
| 3,834,542 | 9/1974 | Linstruth | 210/222 |
| 4,055,497 | 10/1977 | Creps et al. | 210/91 |
| 4,367,143 | 1/1983 | Carpenter | 210/222 |
| 4,370,228 | 1/1983 | Tashiro et al. | 210/223 |
| 5,356,534 | 10/1994 | Zimmerman et al. | 210/222 |

*Primary Examiner*—David A. Reifsnyder
*Attorney, Agent, or Firm*—Harrison & Egbert

[57] ABSTRACT

A magnetic separator apparatus having a configuration of barium ceramic magnets impregnated into polypropylene bars interspersed onto a conveyor belt which passes through an aqueous solution containing unwanted magnetic particulate. A plurality of spaced-apart magnet pairs embedded in each polypropylene bar are configured to provide maximum field penetration and holding strength of the magnets. Particulate attracted to the plurality of magnet pairs are scraped from the conveyor belt into a collection drawer.

8 Claims, 7 Drawing Sheets

MAGNETIC SEPARATOR APPARATUS

RELATED APPLICATIONS

This application claims the benefit of United States Provisional Application Ser. No. 60/038,966 filed Feb. 24, 1997.

BACKGROUND OF THE INVENTION

This invention relates generally to an apparatus used to clean an aqueous solution of unwanted particulate and more particularity relates to a magnetic separator apparatus used to clean an aqueous solution of unwanted magnetic particulate by using a conveyor chain with polypropylene bars having an unique configuration of barium ceramic magnets incorporated therein. This magnetic separator apparatus may be continuously run through the "dirty" solution. In particular, such an aqueous solution is used to clean car and truck bodies and other component parts prior to being immersed into zinc phosphate and zinc chromate baths used to coat the surfaces of these parts and assemblies.

There are many common methods and means used in the prior art to clean aqueous solutions of unwanted particulate. One traditional method is the insertion of magnetic rods directly into the aqueous solution. This type of cleansing system, however, is flawed because of the necessity to frequently manually remove the rods with accumulated metal particulate deposits. These rods must then be cleansed of unwanted particulate and then inserted back into the aqueous solution. As can be appreciated by those skilled in the art, this method of cleaning is time-consuming and labor-intensive. It will be understood that another flaw found in this prior art methodology is that the effectiveness of the magnets used to remove dirt and the like from the solution is greatly diminished as magnetic dirt deposits accumulate on the rods.

Another type of system known in the art that is used to cleanse aqueous solutions of unwanted particulate is the passage of a stainless steel conveyor belt impregnated with magnets through the solution. This type of cleaning system, however, does not adequately and efficiently clean the aqueous solution of all unwanted particulate. This cleaning process is not efficient because the effectiveness of the magnets is drastically reduced by the total encasement of the magnets in the stainless steel conveyor belt. Thus, this type of design reduces the strength of the magnetic fields emanating from the magnets.

Accordingly, these limitations and disadvantages of the prior art are overcome with the present invention, and improved means and techniques are provided which are useful for cleaning an aqueous solution of unwanted magnetic particulate.

SUMMARY OF THE INVENTION

The present invention provides an improved magnetic separator apparatus that overcomes deficiencies in the prior magnetic separator art. As will be hereinafter described in detail, the present invention teaches an unique configuration of magnets impregnated into polypropylene bars that are, in turn, disposed in a spaced-apart relationship upon a conveyor belt disposed in an aqueous solution.

Under the present invention, barium ceramic magnets are impregnated into a plurality of polypropylene bars. The added strength of the barium ceramic magnet means and the unique configuration of these magnets optimize the field penetration and holding strength engendered by these magnets.

It is an object of the present invention to provide an apparatus for continuously cleaning aqueous solutions containing unwanted magnetic particulate.

It is another object of the present invention to provide a magnetic separator apparatus for purging magnetic particulate from an aqueous solution.

It is still another object of the present invention to provide an apparatus for purging magnetic particulate materials from an aqueous solution without requiring human intervention to remove accumulated dirt from the magnetic separation means.

It is yet another object of the present invention to provide an apparatus for purging magnetic particulate materials from an aqueous solution while requiring only minimal maintenance attributable to accumulated dirt forming on the magnetic separation means.

It is an object of the present invention to provide a magnetic separation apparatus for cleaning magnetic particulate materials from an aqueous solution which engenders maximum reach of the magnetic field.

It is a specific object of the present invention to provide an apparatus for separating unwanted magnetic particulate from an aqueous solution, said apparatus comprising: a plurality of spaced-apart magnetic means disposed upon a conveyor belt means for attracting said magnetic particulate; said conveyor belt means disposed within said aqueous solution and configured for movement therethrough; each of said plurality of magnetic means constructed of polypropylene embedded with a like plurality of pairs of magnetic bars disposed on each side of a longitudinal axis of said conveyor belt means; and scraper means fixedly attached to said conveyor belt means for removing said particulate from said plurality of magnetic means for deposit into collection means.

It is another specific object of the present invention to provide an apparatus for separating unwanted magnetic particulate from an aqueous solution, said apparatus comprising: a plurality of spaced-apart magnetic means disposed upon a conveyor belt means for attracting said magnetic particulate; said conveyor belt means disposed within said aqueous solution and configured for movement therethrough; each of said plurality of magnetic means constructed of polypropylene embedded with a like plurality of pairs of magnetic bars disposed on each side of a longitudinal axis of said conveyor belt means; each of said plurality of pairs of magnetic bars having: a first barium ceramic magnet having a top and bottom surface; a second barium ceramic magnet having a top and bottom surface; and with said bottom surface of said first barium ceramic magnet disposed abutably of said top surface of said second barium ceramic magnet, so that the South Pole of said first barium ceramic magnetic is aligned and contiguous with the South Pole of said second barium ceramic magnet; and scraper means fixedly attached to said conveyor belt means for removing said particulate from said plurality of magnetic means for deposit into collection means.

It is still another specific object of the present invention to provide an apparatus for separating unwanted magnetic particulate from an aqueous solution, said apparatus comprising: a plurality of spaced-apart magnetic means uniformly disposed upon a conveyor belt means for attracting said magnetic particulate; said conveyor belt means disposed within said aqueous solution and configured for movement therethrough; each of said plurality of magnetic means constructed of polypropylene embedded with a like plurality of pairs of magnetic bars disposed on each side of a longitudinal axis of said conveyor belt means; each of said plurality of pairs of magnetic bars having: a first barium ceramic magnet having a top and bottom surface; a second barium ceramic magnet having a top and bottom surface; and with said bottom surface of said first barium ceramic magnet disposed abutably of said top surface of said second barium ceramic magnet, so that the South Pole of said first barium ceramic magnetic is aligned and contiguous with the South Pole of said second barium ceramic magnet; each of said sets of pairs of said plurality of pairs of magnetic bars embedded in each of said plurality of spaced-apart magnetic means is disposed symmetrically of said longitudinal axis of said conveyor belt means; and scraper means fixedly attached to said conveyor belt means for removing said particulate from said plurality of magnetic means for deposit into collection means.

These and other objects and features of the present invention will become apparent from the following detailed description, wherein reference is made to the figures in the accompanying drawings with like numerals referring to like components.

IN THE DRAWINGS

DETAILED DESCRIPTION

Figure 1:
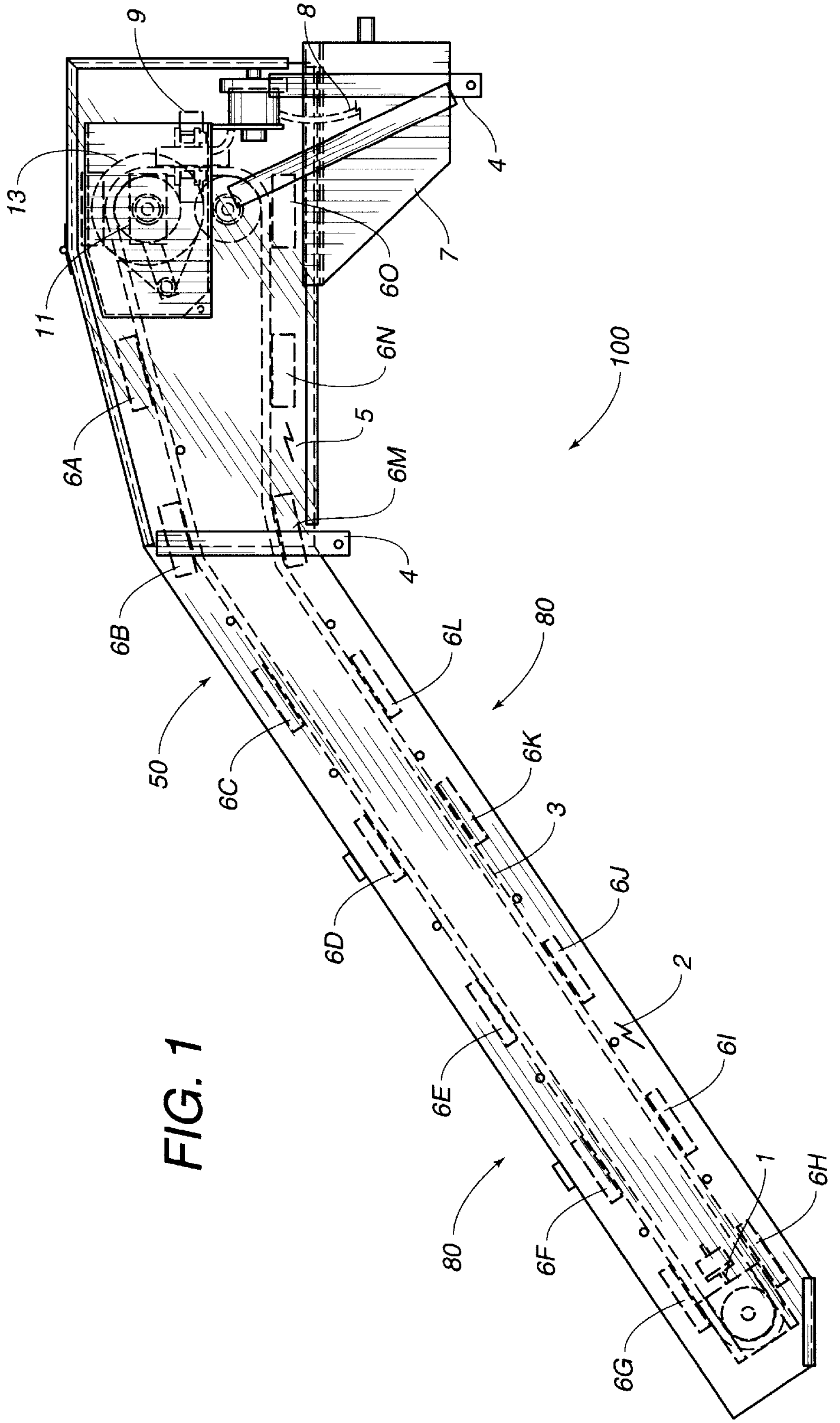
FIG. 1 depicts a right side elevation view of the preferred embodiment of the present invention.
Figure 2:
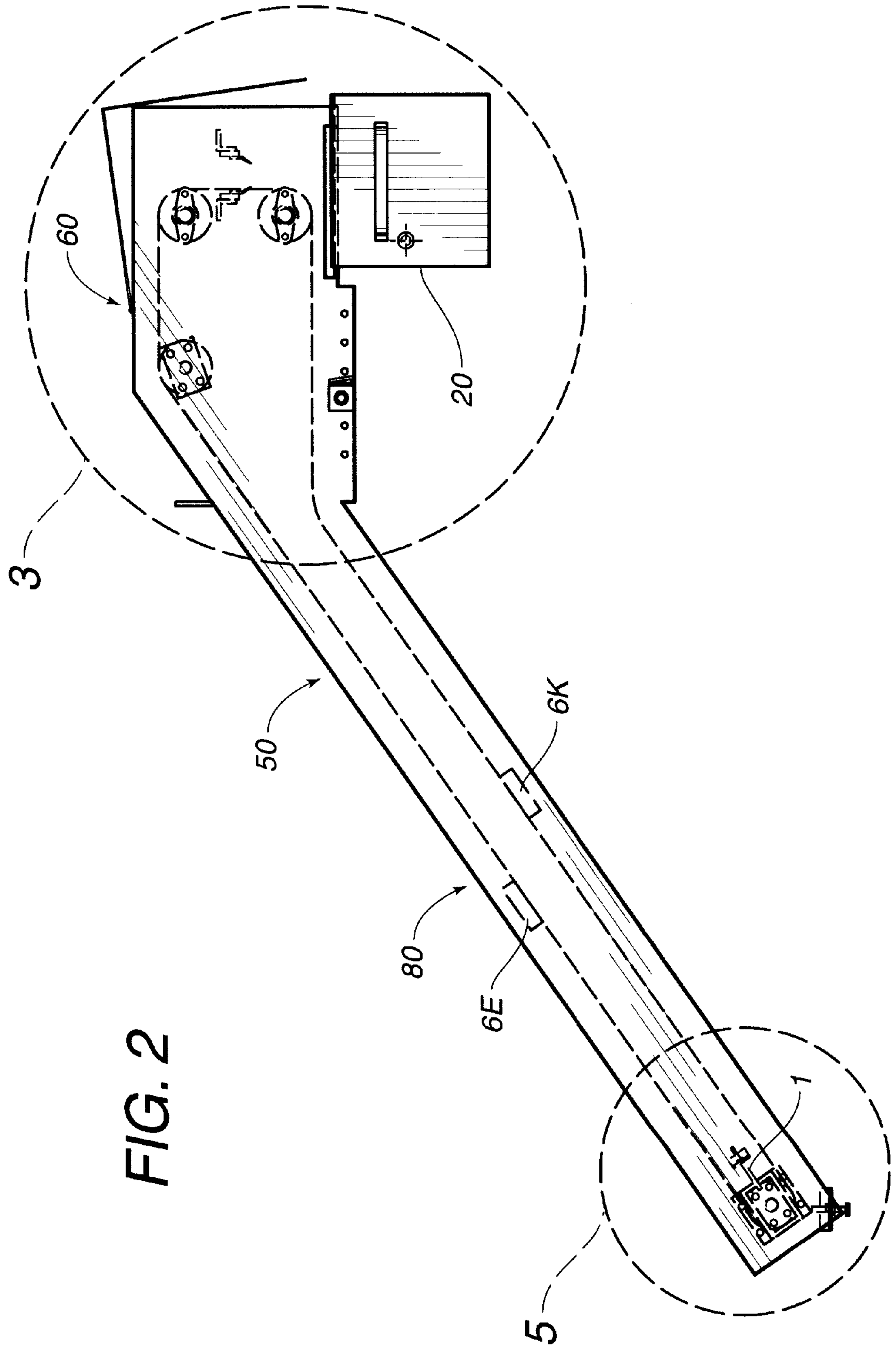
FIG. 2 depicts a right side elevation view of a portion of the preferred embodiment depicted in FIG. 1.
Figure 3:
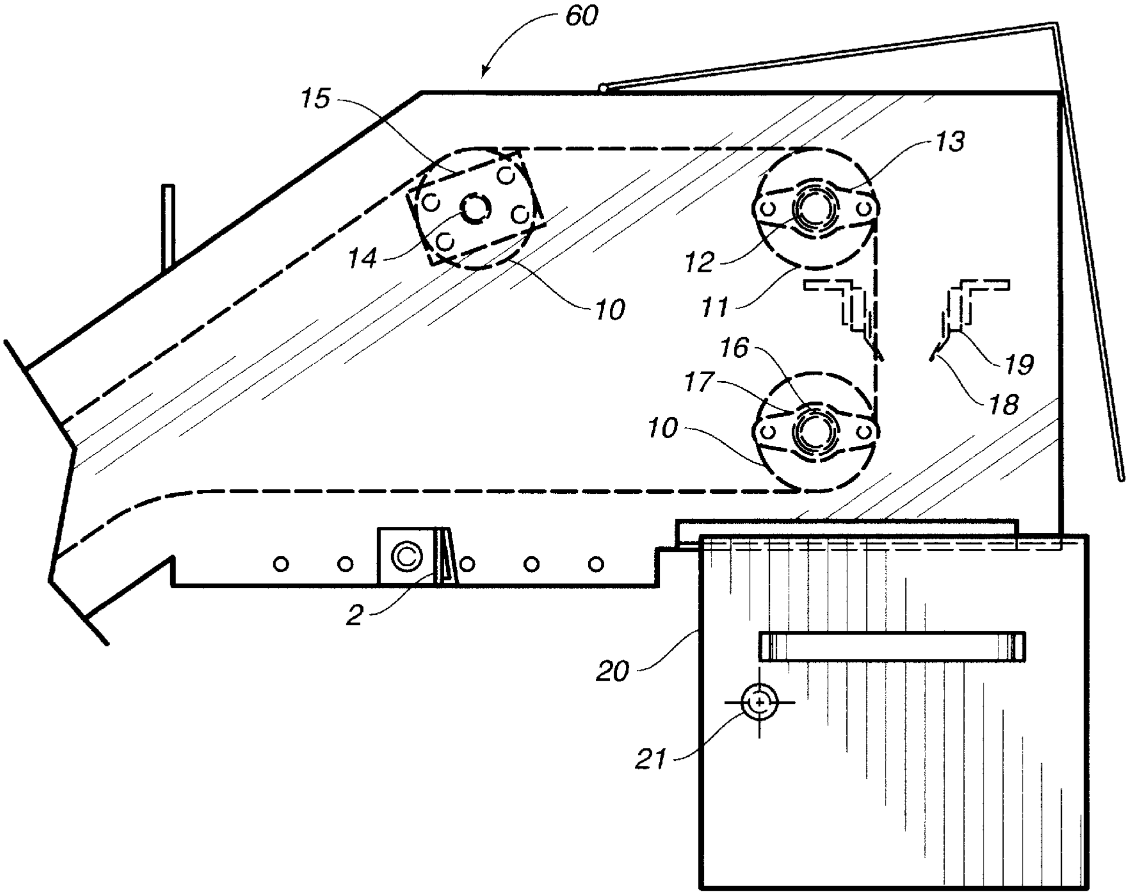
FIG. 3 depicts a right side isolated elevation view of a portion of the preferred embodiment depicted in FIG. 2.
Figure 4:
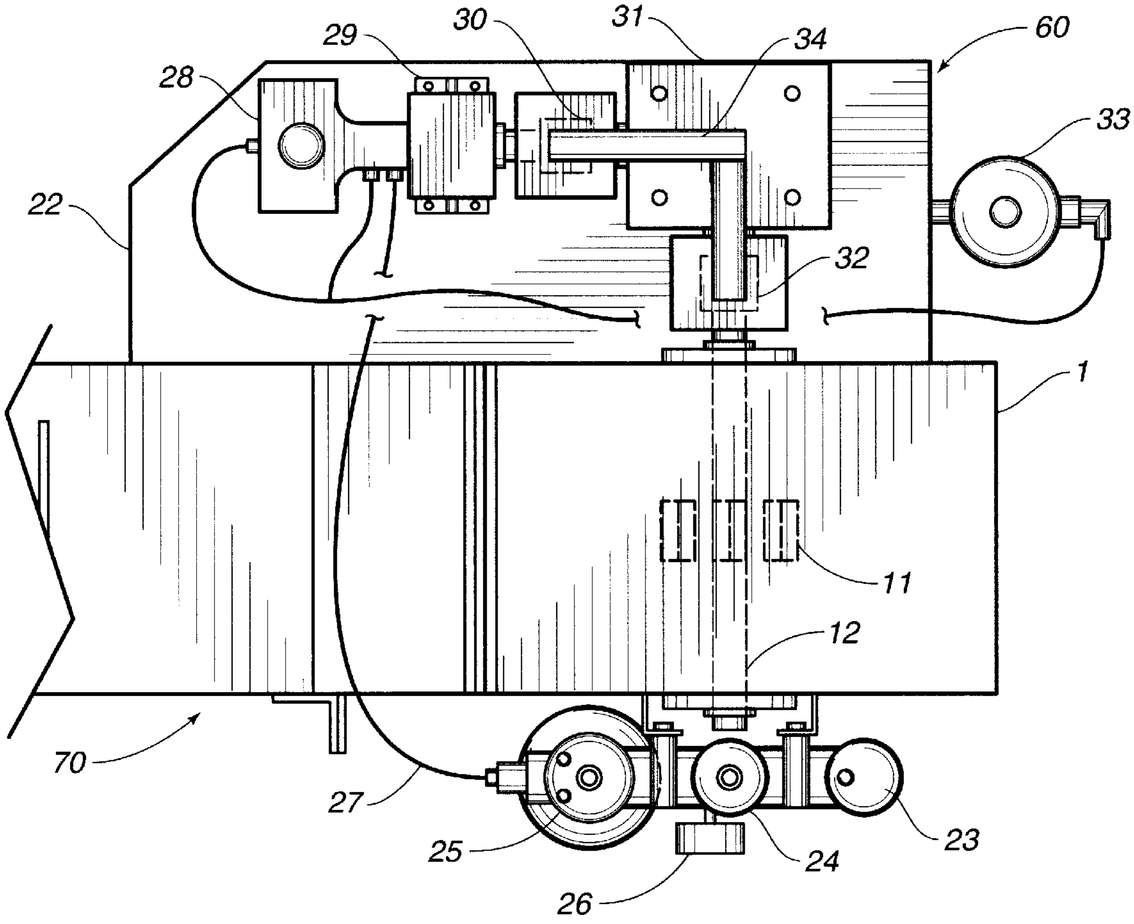
FIG. 4 depicts an isolated plan view of a portion of the preferred embodiment depicted in FIG. 2.
Figure 5:
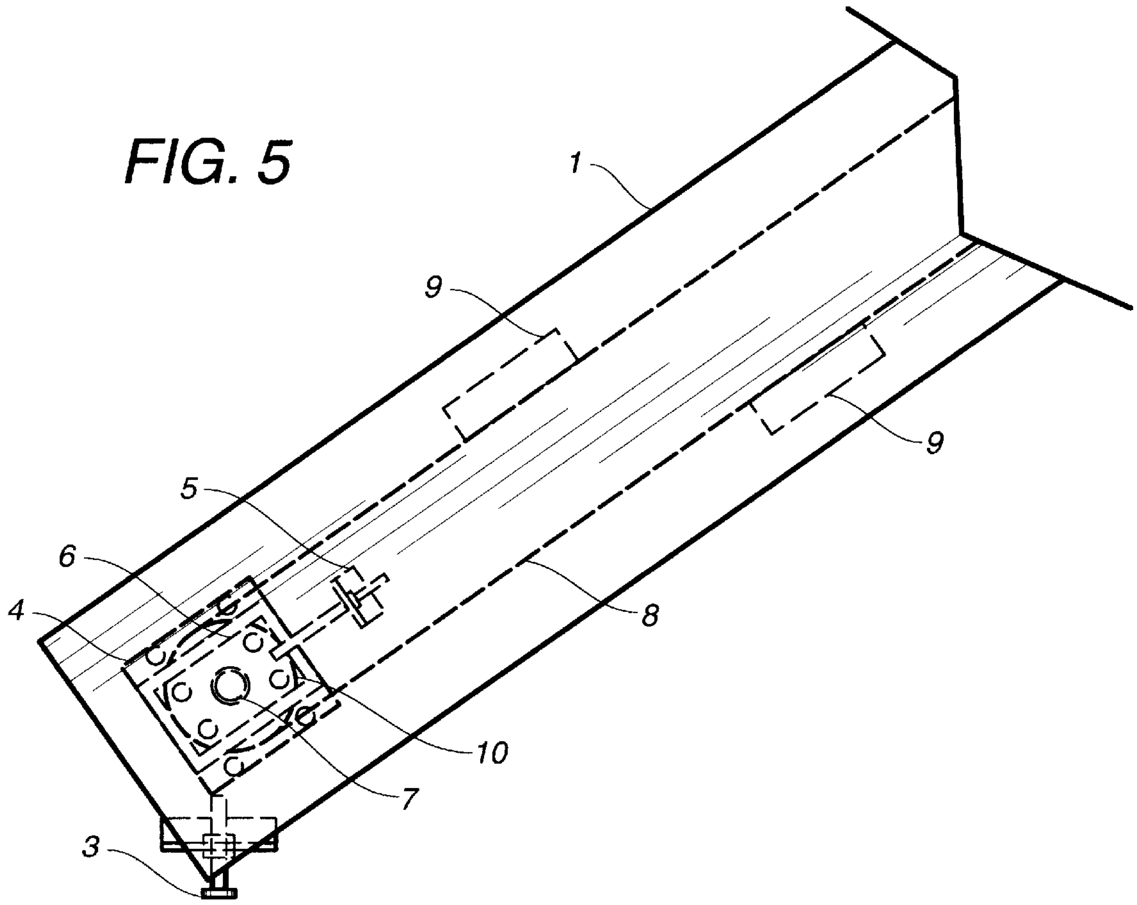
FIG. 5 depicts another right side isolated elevation view of a portion of the preferred embodiment depicted in FIG. 2.

Referring now collectively to FIGS. 1–5, there is illustrated the preferred embodiment of a magnetic separator device of the present invention. Magnetic separator device 100 of the present invention consists of preferably stainless steel conveyor belt means 50 continuously moving through a vessel (not shown) holding aqueous solution. It will be understood that U.S. Pat. No. 4,055,497 generally describes the state of the conveyor belt art applicable to a settling tank. Thus, conveyor belt means 50 passes through upper housing 60 and lower housing 70 in a manner well known in the art. As will be hereinafter described, according to the teachings of the present invention, stainless steel conveyor belt means 50 should preferably be configured with a plurality of spaced-apart magnetic means 80 comprising plurality of barium ceramic magnet means 90 impregnated into a polypropylene bar. Motor and concomitant gearbox 22 driving conveyor belt means 50 are located in upper housing 60. A conventional external power supply line provides the electrical or pneumatic power to drive motor 22. As will be appreciated by those skilled in the art, blade scraper assembly 19 containing plurality of scraper blade means 18 is also located in the interior of upper housing 60.

It will further be seen that preferred embodiment 100 comprises frame with lid 1, mounting clip means 2, adjustable bottom support means 3, bushing block cover means 4, tension adjustment clip means 5, plurality of spaced-apart magnetic block means 6A, B, C, D, . . . N, O and idler shaft 7 and associated idler chain 8, magnetic block means 9, secondary sprocket means (including return, guide, and feed) 10, drive sprocket means 11 and associated drive shaft 12 and concomitant drive shaft bearings 13, guide shaft 14, guide shaft bushing block means 15, feed shaft 16 and associated feed shaft bearings 17, plurality of scraper blade means 18 and associated plurality of blade holder assemblies 19, scraper sludge collection drawer means 20, excess fluid drain plug means 21, motor and associated gearbox shelf 22, filter means 23, regulator 24, lubricator 25, pressure gauge 26, air or electric line kit 27 and associated air or electric motor 28, motor riser block 29, motor/reducer coupling means 30 and concomitant reducer gearbox 31, reducer/drive shaft coupling means 32, silencer/reclassifier 33, and coupling guard assembly 34.

As will be evident to those skilled in the art, motor 22 drives conveyor belt means 50 with plurality of spaced-apart magnet means 80 downwardly at an angle into the vessel holding the aqueous solution, so that the solution may be cleansed of metal particulate. After passing through the solution, the metal particulate will naturally adhere to plurality of sections 6A, B, C, D, E, F, G, H, I, J, K, L, M, N, and O of conveyor belt means 50 having the magnet means taught by the present invention contained thereon. The motor continues to drive conveyor belt means 50 and simultaneously drives the unwanted metal particulate up and out of the vessel and towards upper housing 60. In a manner common in the art, plurality of scraping means 18 located in upper housing 60 will then scrape the accumulated metal particulate off the conveyor belt and into collection bin 20. Collection bin 20, of course, may be emptied at a later time whenever necessary.

It has been found that the infirmity of the prior art, wherein unwanted particulate deposits upon magnetic separation means thereby adversely affecting the separation capability, may be effectively overcome by a combination of a novel arrangement of the magnetic separation means and by suitably coating this magnetic separation means. According to the preferred embodiment of the present invention, by configuring conveyor belt means 50 with plurality of spaced-apart permanent magnetic means 80 comprising barium ceramic material, separation of metal particulate contemplated hereunder may be accomplished with an efficiency heretofore unknown in the art.

Figure 6:
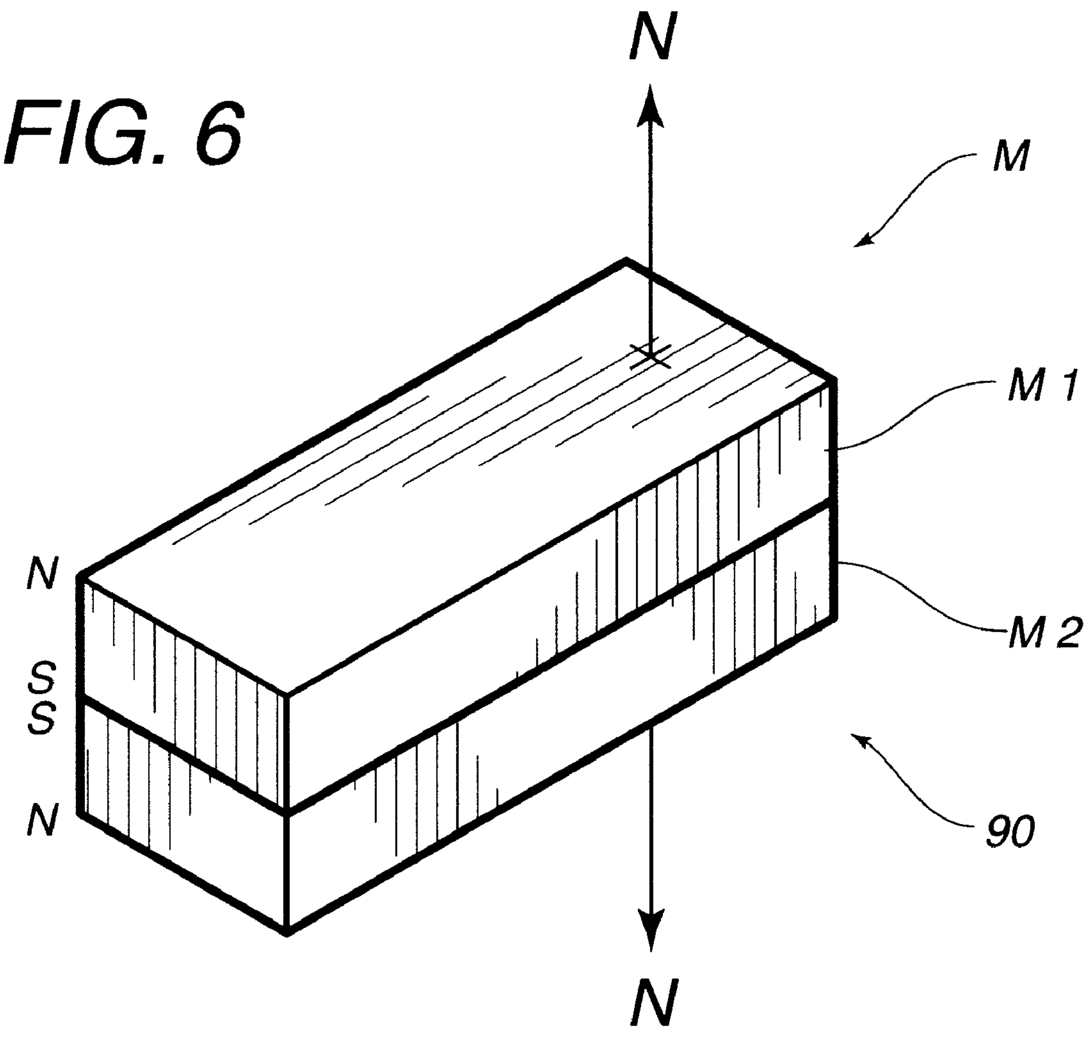
FIG. 6 depicts a simplified frontal perspective view of a pair of magnetic means under the present invention.
Figure 7:
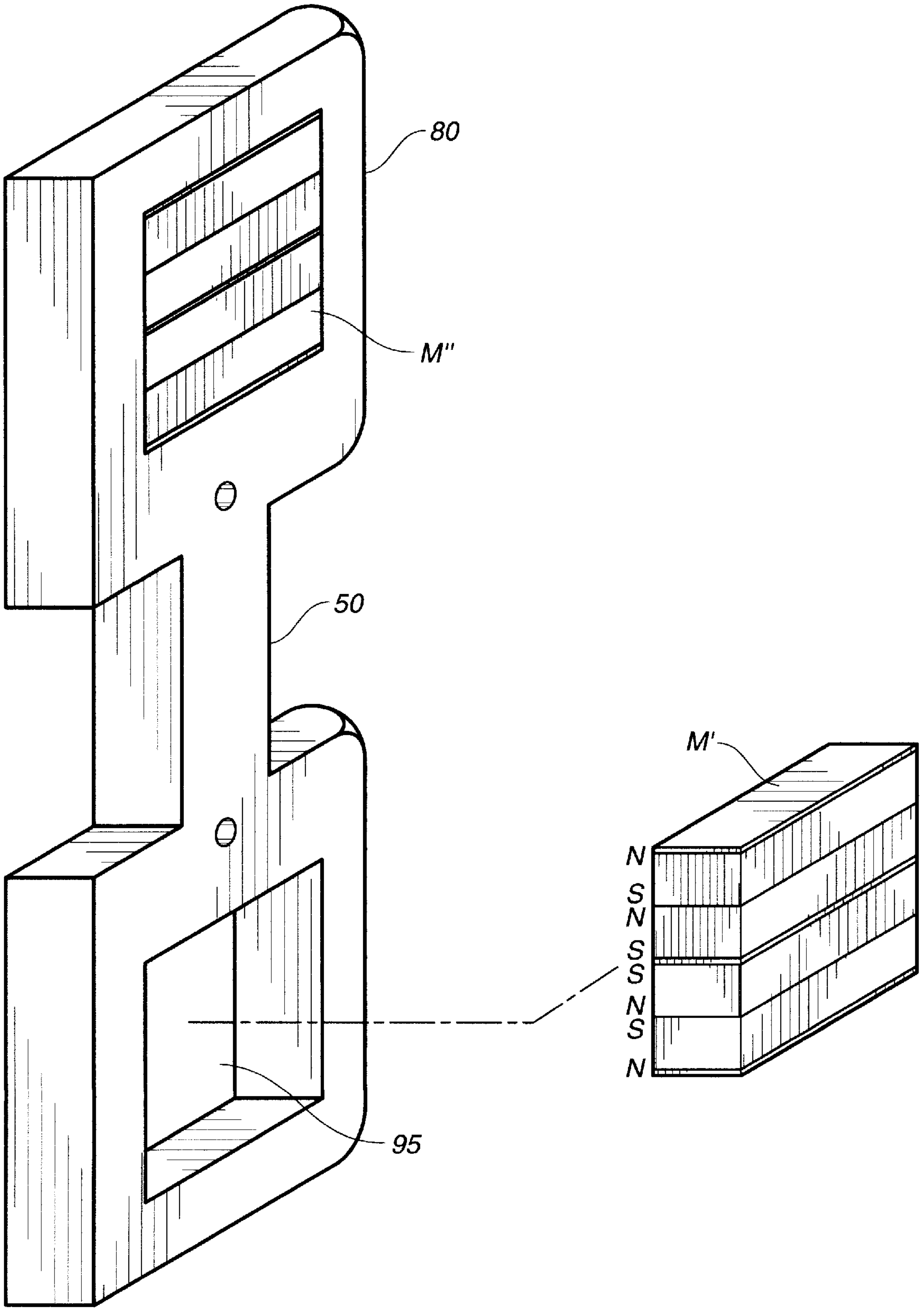
FIG. 7 depicts a frontal perspective view of the preferred embodiment of the polypropylene bars depicted in FIGS. 1–3, showing the disposition of magnetic means therein.

Now referring to FIGS. 6 and 7, there is illustrated the unique configuration of the plurality of polypropylene bars 6A–O attached to stainless steel conveyor belt means 50. FIG. 7 illustrates the configuration of each of the polypropylene bars 80 impregnated with ceramic barium magnet means M, illustrated in FIG. 6. Each of the barium ceramic magnet pair M—depicted in FIG. 7 as M' and M" for clarity—is embedded into each respective open area 95 disposed on either side of polypropylene bar 80 shown in FIG. 7. It should be evident that space 95 is configured to abuttably receive magnetic means M.

Referring specifically to FIG. 6, there is illustrated the unique configuration of each of the plurality of ceramic barium magnet means impregnated into plurality of polypropylene bars 6A–O attached to stainless steel conveyor belt means 50. Thus, magnet means pair M, comprising upper magnet means M1 and lower magnet means M2—having similar height, width and length—are oriented so that the magnetic poles normal to the widest surface are forced together against like poles. In particular, the bottom surface of magnet block M1 is disposed upon the top surface of magnet block M2 so that their respective South Poles are contiguous.

Accordingly, the North Pole of magnet block M1 is directed normally away from its top surface and the North Pole of magnet block M2 is directed normally away from its bottom surface. The unique configuration taught by this invention, wherein magnetic means are imbedded into a plurality of polypropylene bars, has been found to increase the field strength or holding power and reaching power of the pairs of barium ceramic magnets M1 and M2. It has also been found that, for the configuration shown in FIGS. 6 and 7, a 10 inch field reach has been achieved at 1 Gauss unit. More particularly, for the preferred embodiment, M1 and M2 are composed of two ⅜ inch tall by ¾ inch wide by 2 inches long barium ceramic magnets having the polarization normal to the ¾ inch wide surfaces that are forced together with the respective South Poles turned in. During testing, the field strength of this magnetic configuration was compared to the field strength of a conventional single ¾ inch tall by ¾ inch wide by 2 inches long solid barium ceramic magnet with poles normal to the ¾ inch surfaces. Both magnet arrangements had very good field strength.

Similarly, the linear reaching power of these two test magnet configurations was tested. While the linear reaching power of the conventional single solid barium ceramic magnet was only eleven inches, the linear reaching power of the pair of barium ceramic magnets having the unique configuration taught by the present invention was 20 inches. Ergo, it will be appreciated that the magnetic pair of solid barium ceramic magnet means taught by the present invention delivers almost double the linear reaching power of a conventional single similar magnet means.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to measured by the scope of the appended claims herein.

What is claimed is:

1. An apparatus for separating unwanted magnetic particulate from an aqueous solution, said apparatus comprising:

a plurality of spaced-apart magnetic means disposed upon a conveyor belt means for attracting said magnetic particulate;

said conveyor belt means disposed within said aqueous solution and configured for movement therethrough;

each of said plurality of magnetic means constructed of polyproylene impregnated with a like plurality of pairs of magnetic bars disposed on each side of a longitudinal axis of said conveyor belt means; and scraper means fixedly attached to said conveyor belt means for removing said particulate from said plurality of magnetic means for deposit into collection means.

2. The apparatus recited in claim 1, wherein each of said plurality of pairs of magnetic bars comprises:

a first barium ceramic magnet having a top and bottom surface;

a second barium ceramic magnet having a top and bottom surface; and with said bottom surface of said first barium ceramic magnet disposed abutably of said top surface of said second barium ceramic magnet, so that the South Pole of said first barium ceramic magnetic is aligned and contiguous with the South Pole of said second barium ceramic magnet.

3. The apparatus recited in claim 2, wherein said plurality of spaced-apart magnetic means are disposed uniformly upon said conveyor belt means.

4. The apparatus recited in claim 2, wherein each of said sets of pairs of said plurality of pairs of magnetic bars embedded in each of said plurality of spaced-apart magnetic means is disposed symmetrically of said longitudinal axis of said conveyor belt means.

5. An apparatus for separating unwanted magnetic particulate from an aqueous solution, said apparatus comprising:

a plurality of uniformly spaced-apart magnetic means disposed upon a conveyor belt means for attracting said magnetic particulate;

said conveyor belt means disposed within said aqueous solution and configured for movement therethrough;

each of said plurality of magnetic means constructed of polypropylene impregnated with a like plurality of pairs of magnetic bars disposed on each side of a longitudinal axis of said conveyor belt means;

each of said plurality of pairs of magnetic bars having:

a first barium ceramic magnet having a top and bottom surface;

a second barium ceramic magnet having a top and bottom surface; and with said bottom surface of said first barium ceramic magnet disposed abutably said top surface of said second barium ceramic magnet, so that the South Pole of said first barium ceramic magnetic is aligned and contiguous with the South Pole of said second barium ceramic magnet; and scraper means fixedly attached to said conveyor belt means for removing said particulate from said plurality of magnetic means for deposit into collection means.

6. The apparatus recited in claim 5, wherein said plurality of spaced-apart magnetic means are disposed uniformly upon said conveyor belt means.

7. The apparatus recited in claim 5, wherein each of said sets of pairs of said plurality of pairs of magnetic bars embedded in each of said plurality of spaced-apart magnetic means is disposed symmetrically of said longitudinal axis of said conveyor belt means.

8. An apparatus for separating unwanted magnetic particulate from an aqueous solution, said apparatus comprising:

a plurality of spaced-apart magnetic means uniformly disposed upon a conveyor belt means for attracting said magnetic particulate;

said conveyor belt means disposed within said aqueous solution and configured for movement therethrough;

each of said plurality of magnetic means constructed of polypropylene impregnated with a like plurality of pairs of magnetic bars disposed on each side of a longitudinal axis of said conveyor belt means;

each of said plurality of pairs of magnetic bars having:

a first barium ceramic magnet having a top and bottom surface;

a second barium ceramic magnet having a top and bottom surface; and with said bottom surface of said first barium ceramic magnet disposed abutably of said top surface of said second barium ceramic magnet, so that the South Pole of said first barium ceramic magnetic is aligned and contiguous with the South Pole of said second barium ceramic magnet;

each of said sets of pairs of said plurality of pairs of magnetic bars impregnated in each of said plurality of spaced-apart magnetic means is disposed symmetrically of said longitudinal axis of said conveyor belt means; and scraper means fixedly attached to said conveyor belt means for removing said particulate from said plurality of magnetic means for deposit into collection means.

* * * * *